US011411639B2

(12) United States Patent
Sorond et al.

(10) Patent No.: US 11,411,639 B2
(45) Date of Patent: *Aug. 9, 2022

(54) SPECTRUM SHARING FOR A TERRESTRIAL-SATELLITE HYBRID ENVIRONMENT (71) Applicant: DISH Wireless L.L.C., Englewood, CO (US)

(72) Inventors: Mariam Sorond, Reston, VA (US); Siddhartha Chenumolu, Broadlands, VA (US); Mehdi Alasti, Reston, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/065,148

(22) Filed: Oct. 7, 2020

(65) Prior Publication Data
US 2021/0036769 A1 Feb. 4, 2021

Related U.S. Application Data (63) Continuation of application No. 16/505,238, filed on Jul. 8, 2019, now Pat. No. 10,848,237.

(51) Int. Cl.
*H04H 20/74* (2008.01)
*H04B 7/185* (2006.01)
(Continued)

(52) U.S. Cl.
CPC ......... *H04B 7/18523* (2013.01); *H04B 7/155* (2013.01); *H04B 7/2615* (2013.01)

(58) Field of Classification Search
CPC ...... H01Q 1/244; H01Q 15/16; H01Q 19/106; H01Q 21/065; H01Q 25/002; H01Q 3/242;
(Continued)

(56) References Cited

U.S. PATENT DOCUMENTS

2006/0189309 A1* 8/2006 Good .................... H04W 16/14
455/427
2015/0188644 A1 7/2015 Kang et al.
(Continued)

FOREIGN PATENT DOCUMENTS

EP 1 569 363 A1 8/2005

OTHER PUBLICATIONS

International Search Report and Written Opinion for PCT/US2020/040407 dated Oct. 16, 2020, all pages.

*Primary Examiner* — Tu X Nguyen
(74) *Attorney, Agent, or Firm* — Kilpatrick Townsend & Stockton, LLP (57) ABSTRACT Various arrangements for spectrum sharing among a terrestrial network and a non-terrestrial network are presented herein. A first bandwidth part having a first frequency range for may be assigned use for communication between one or more UE of a plurality of UE and a terrestrial cellular network when a high signal strength is present. A second bandwidth part having a second frequency range may be assigned for use for communication between one or more UE of the plurality of UE and the terrestrial cellular network when a low signal strength is present. A third bandwidth part having a third frequency range can be assigned for use for communication between one or more UE of the plurality of UE and a non-terrestrial network. The third bandwidth part can overlap with the first bandwidth part but not the second bandwidth part.

20 Claims, 5 Drawing Sheets (51) Int. Cl.
 *H04B 7/155* (2006.01)
 *H04B 7/26* (2006.01)

(58) Field of Classification Search
 CPC ........ H01Q 3/247; H01Q 3/2605; H01Q 3/30;
  H01Q 5/45; H01Q 9/30; H01Q 1/02;
  H01Q 25/001; H01Q 3/2694; H01Q 5/42;
  H04H 20/74; H04H 40/90
 See application file for complete search history.

(56) References Cited

U.S. PATENT DOCUMENTS

| | | |
|---|---|---|
| 2017/0188314 A1 | 6/2017 | Mueck et al. |
| 2017/0245185 A1 | 8/2017 | Chuberre et al. |
| 2019/0053103 A1 | 2/2019 | Manolakos et al. |

* cited by examiner

SPECTRUM SHARING FOR A TERRESTRIAL-SATELLITE HYBRID ENVIRONMENT

CROSS-REFERENCES TO RELATED APPLICATIONS

This application is a continuation of U.S. patent application Ser. No. 16/505,238, filed on Jul. 8, 2019, entitled "Spectrum Sharing for a Terrestrial-Satellite Hybrid Environment," the disclosure of which is hereby incorporated by reference in its entirety for all purposes.

BACKGROUND

Traditionally, user equipment instances, communicate with either a non-terrestrial network or a terrestrial network. Typically, such communication is accomplished using different frequency bands. However, dedicating spectrum for either terrestrial or non-terrestrial communications may not be efficient. For instance, if a terrestrial network is not located near-by, there may be no interference issues in reusing the spectrum for non-terrestrial communications.

SUMMARY

Various embodiments are described related to a method for spectrum sharing among a terrestrial network and a non-terrestrial network. In some embodiments, a method for spectrum sharing among a terrestrial network and a non-terrestrial network is described. The method may include assigning, by the terrestrial network, a first bandwidth part of a channel for use for communication between a plurality of user equipment (UE) and the terrestrial network when a high signal strength may be present. The method may include assigning, by the terrestrial network, a second bandwidth part for use for communication between the plurality of UEs and the terrestrial network when a low signal strength may be present. The second bandwidth part may overlap with the first bandwidth part. A third bandwidth part may be assigned for use for communication between the plurality of UEs and the non-terrestrial network. The third bandwidth part may overlap with the first bandwidth part but not the second bandwidth part. The method may include communicating, by a UE of the plurality of UEs, with the terrestrial network using the second bandwidth part, the non-terrestrial network using the third bandwidth part, or both.

Embodiments of such a method may include one or more of the following features: transmitting, by the terrestrial network, definitions of the first bandwidth part and the second bandwidth part to the plurality of UEs. The method may include performing, by the UE of the plurality of UE, a signal strength measurement indicative of a signal strength of a signal received from the terrestrial network. The method may include transmitting, by the UE, an indication of the signal strength measurement to the terrestrial network. The method may include analyzing, by the terrestrial network, the indication of the signal strength measurement to select the second bandwidth part. Analyzing the indication of the signal strength measurement may include comparing the indication of the signal strength measurement to a threshold signal strength value. The method may include transmitting, by the terrestrial network, a message indicating the second bandwidth part may be activated to the UE. Communicating with the terrestrial network may be performed using the second bandwidth part based on the message. The method may include communicating, by the UE, with the non-terrestrial network using the third bandwidth part. The method may include communicating, by a second UE, with the non-terrestrial network using the third bandwidth part. The plurality of UEs may use 5G New Radio (NR) radio access technology (RAT) to communication with the terrestrial network.

In some embodiments, a system that shares spectrum among a terrestrial network and a non-terrestrial network is described. The system may include a plurality of user equipment (UE). The system may include a terrestrial cellular network comprising a plurality of base stations. The terrestrial cellular network may be configured to assign a first bandwidth part of a channel for use for communication between a first group of UE of the plurality of UEs and the terrestrial network when a high signal strength may be present. The terrestrial cellular network may be configured to assign a second bandwidth part for use for communication between a second group of UE of the plurality of UEs and the terrestrial network when a low signal strength may be present. The second bandwidth part may overlap with the first bandwidth part. A third bandwidth part may be assigned for use for communication between a third group of the plurality of UEs and the non-terrestrial network. The third bandwidth part may overlap with the first bandwidth part but not the second bandwidth part. The terrestrial cellular network may communicate with the first group of UE using the first bandwidth part. The terrestrial cellular network may communicate with the second group of UE using the second bandwidth part.

Embodiments of such a method may include one or more of the following features: the terrestrial cellular network may be further configured to transmit definitions of the first bandwidth part and the second bandwidth part to the plurality of UEs. Each UE of the plurality of UEs may be configured to perform a signal strength measurement indicative of a signal strength of a signal received from the terrestrial network. Each UE of the plurality of UEs may transmit an indication of the signal strength measurement to the terrestrial network. The terrestrial cellular network may be further configured to analyze each indication received from the plurality of UEs to select either the first bandwidth part or the second bandwidth part. The terrestrial cellular network being configured to analyze each indication may include comparing each indication to a threshold signal strength value. The system may further include the non-terrestrial network, the non-terrestrial network comprising one or more satellites. The non-terrestrial network may communicate with the third group using the third bandwidth part. The first group of UE and the second group of UE of the plurality of UEs use 5G New Radio (NR) radio may access technology (RAT) to communication with the terrestrial cellular network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

As detailed herein, a non-terrestrial network (NTN) or other form of satellite-based communication network may share spectrum with a terrestrial network (TN). When a piece of user equipment ("UE") is communicating with a TN, the TN may output signals that are received with a much higher signal strength by the UE than a NTN that is outputting signals from LEO, MEO, and/or GEO satellites. Therefore, if the UE is relatively close to a base station of the TN, even if the same spectrum is being used by the NTN and TN, communication with the TN is possible since the TN's signal strength as received by the UE greatly exceeds the signal strength of the NTN as received by the UE. When the UE is far from any base station of the TN, the signal strength of the NTN as received by the UE may be significantly greater than the signal strength of the TN as received by the UE. In such a situation, without causing or experiencing interference from the TN, the UE can communicate with the NTN using at least some of the same spectrum that is used to communicate with the TN in geographical regions close to base stations of the TN.

While UE can be present in locations where either the signal strength of the NTN or the TN will be unambiguously greater and will not be affected by interference from the other network using the same spectrum, regions can be expected to be present where neither the TN or NTN has a significantly greater signal strength. For instance, if the UE is located near the edge of coverage provided by a base station of the TN, the signal strength of the NTN and TN may be similar. This situation may result in interference if the same frequencies are being used for communication by the NTN and TN.

As detailed herein, channel bandwidth that has been allocated for communication may be subdivided into multiple bandwidth parts (BWPs). A BWP, as defined by 3PP in the 5G standard, is a contiguous set of resource allocation of frequencies defined by network for communication between UEs and a base station (e.g., a gNodeB). A base station and a UE only communicate within a BWP that is active at the UE. For a 5G implementation, each UE can be assigned up to four BWPs in each direction (uplink and downlink communications) but only one BWP can be active for a UE in each direction at a given time. For a 5G implementation, a gNodeB can switch the active BWP of a UE either through Layer 1 DCI (fast switching) or through higher layer RRC signaling. The channel bandwidth as a whole may be used for communication between a UE and a base station (BS) of a TN when a strong signal strength from a BS of the TN is measured. A first bandwidth part (BWP) within the channel bandwidth may be used for communication between a UE and one or more satellite of an NTN when no signal strength or a weak signal from a BS of the TN is measured. A second BWP, that does not overlap the first BWP, may be used for communication with the TN when a relatively low signal strength with the BS of the TN is measured. By not having the two BWPs overlap, interference is reduced near regions where communication with both the NTN and TN may be attempted. Within this document, references to a NTN are made. While NTN can refer specifically to a 5G NR implementation, NTN is also used to refer to other forms of satellite-based communication networks.

Figure 1:
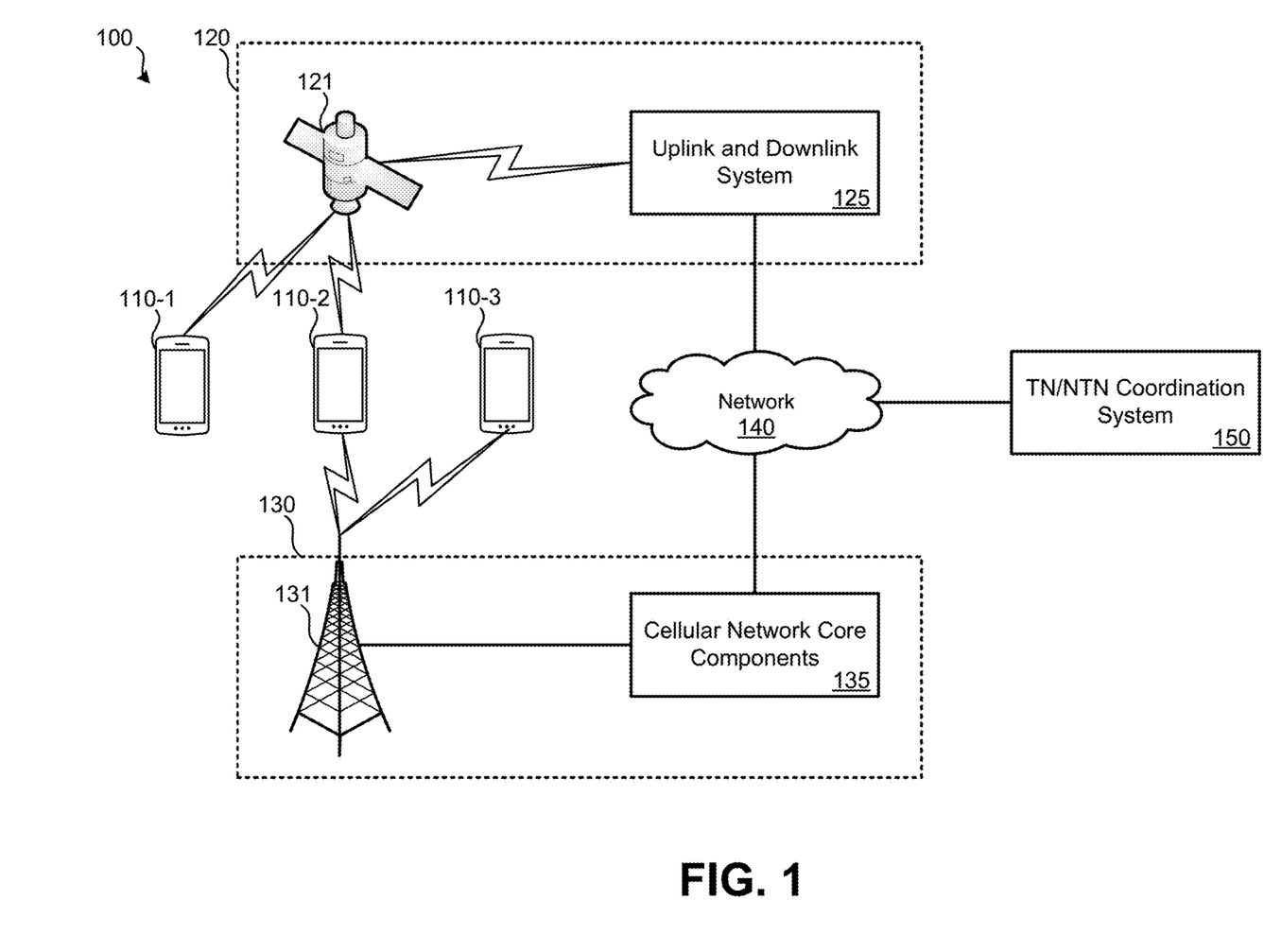
FIG. 1 illustrates an embodiment of a terrestrial-satellite hybrid system.

Further detail is provided in relation to the figures. FIG. 1 illustrates an embodiment of a terrestrial-satellite hybrid system 100. System 100 can include: UE 110 (110-1, 110-2, 110-3); NTN 120; satellite 121; TN 130; uplink and downlink system 125; base station 131; cellular network core components 135; network 140; TN/NTN coordination system 150. UE 110 may communicate with either TN 130; NTN 120; or both. For instance, UE 110-1 only communicates with NTN 120; UE 110-3 only communicates with TN 130; and UE 110-2 communicates with both NTN 120 and TN 130. While three UE 110 are illustrated as part of system 100, it should be understood that this is for illustration purposes only. In a real world system, thousands of UEs 110 may be present and may be a mix of UE that can communicate with only a TN, only an NTN, or both types of networks. UE 110 can represent various forms of electronics that can communicate wirelessly, include smartphones, cellular phones, laptops, computers, tablet computers, etc. A piece of UE 110 can also represent an access point (AP) that can be used by other devices to communicate. For instance, an AP may be installed on a train, boat, or airplane and can allow other UEs to communicate with a remote server or network, such as the Internet. As an example, UE 110-2 may be an AP that is located on a high-speed train. Near urban areas, it may be able to communicate with TN 130; in rural areas where no base stations are present, UE 110-2 may communicate with NTN 120.

UE 110 may be configured to communicate using one or more radio access technologies (RATs). In some embodiments, UE 110 uses 5G New Radio (NR) RAT to communicate with NTN 120 and TN 130. In other embodiments, different one or more different RATs may be used. There, it may be possible that 5G NR RAT may be used to communicate with TN 130 but some other RAT is used to communicate with NTN 120.

NTN 120 may include one or more satellites, such as satellite 121. In some embodiments, a constellation of low Earth orbit (LEO) or middle earth orbit (MEO) satellites are used for communication with UE 110. Additionally or alternatively, a single or small number of geosynchronous satellites in GEO may be used as part of NTN 120 to communicate with UE 110. For illustration purposes, only a single satellite, satellite 121, is shown. Whether in LEO, MEO, or GEO, the one or more satellite of NTN 120 may communicate with uplink and downlink system 125. Uplink and downlink system 125 may manage communications between network 140 and satellites of NTN 120. In some embodiments, NTN 120 may use a fixed portion of bandwidth. That is, the frequencies used for communication between NTN 120 and UE 110 may not be readily adjustable. Rather, other systems, such as TN 130, may need to adapt in view of NTN 120. In other embodiments, NTN 120 may be able to adjust the bandwidth parts used for communication with UE 110.

TN 130 may be a cellular network, such as a 5G NR cellular network. TN 130 may include multiple base stations. For simplicity, only a single BS 131 is illustrated. In some embodiments, base station 131 may be a gNodeB of a 5G NR network. Base station 131 may communicate with cellular network core components 135. Cellular network core components 135 may manage aspects of TN 130 and may communicate with network 140. For example, cellular network core components 135 may control the bandwidth parts that UE are instructed to use for communication with TN 130.

Network 140 can represent one or more public and/or private networks. In some embodiments, network 140 can include the Internet. Network 140 may include a private communication network of a communications service provider.

TN/NTN coordination system 150 may communicate with cellular network core components 135 via network 140. TN/NTN coordination system 150 may include one or more server systems. Such server systems may be configured to manage definitions of BWPs provided to UE via TN 130. TN/NTN coordination system 150 may also communicate with uplink and downlink system 125 via network 140. TN/NTN coordination system 150 may define how a channel bandwidth is shared by both NTN 120 and TN 130 for communication with UE 110 to reduce or eliminate interference. TN/NTN coordination system 150 may be able to adjust the respective bandwidth of portions assigned for communication to accommodate traffic loads. Functionality that is part of TN/NTN coordination system 150 may be incorporated as part of cellular network core components 135 or directly at base stations, such as base station 131. In still other embodiments, functionality that is part of TN/NTN coordination system 150 may be incorporated as part of uplink and downlink system 125.

Figure 2:
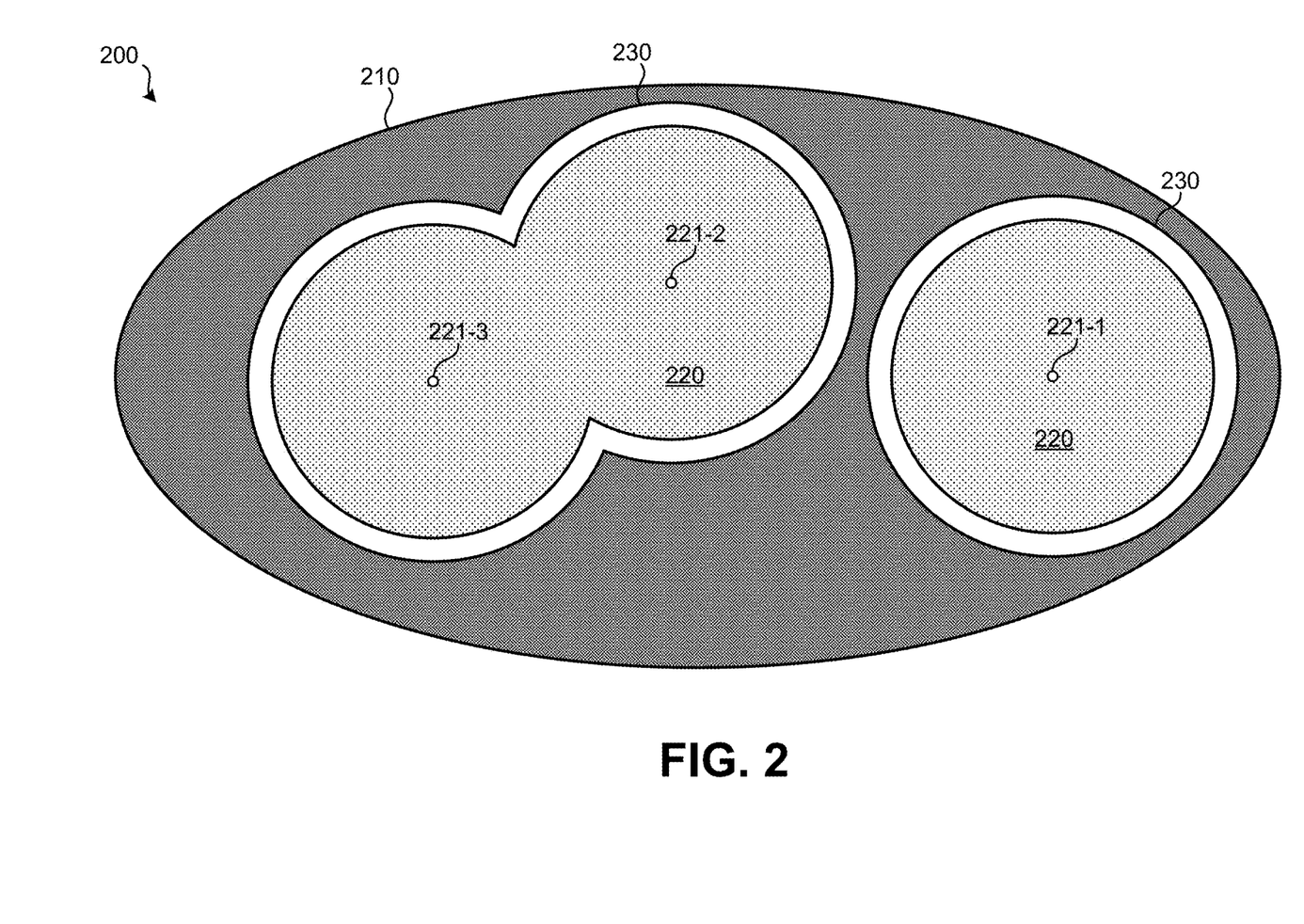
FIG. 2 illustrates an embodiment of regions in which spectrum is shared among a TN and NTN.

FIG. 2 illustrates an embodiment 200 of regions in which spectrum is shared and reused among a TN and NTN. In region 210, represented by the darker shading, only communication with the NTN is possible. In such regions, communication with the TN is not possible because the signal strength received from the one or more nearest base stations is very low or non-existent. Since base stations 221 are so far away and the received signal strength at the UE from such base stations 221, there is no interference or very little interference, regardless if base stations 221 are transmitting on the same frequencies used for communication between the NTN and the UE. Similarly, UE within region 220 are far enough away that it is inconsequential for interference in region 210 on what frequencies such UE are transmitting.

Regions 220 represent regions in which a UE receives a high signal strength from base stations 221. In these regions, the signal strength received from base stations 221 (e.g., base stations 221-1, 221-2, and 221-3) is so much greater than the signal strength from the satellites outputting signals on the same frequencies over region 210, that the signals between the NTN and UE in region 210 do not affect TN communication between UE and a BS of base stations 221 within regions 220.

Regions 230 represent regions in which neither the NTN and TN has a significantly greater signal strength. To decrease interference, a BWP within the channel bandwidth that does not conflict with a second BWP within the channel bandwidth used in region 210 may be used for communication. Therefore, a UE is determined to be in region 230, the BWP used for communication with a BS may not overlap with a different BWP used for communication between the NTN and UE.

Since a BS typically communicates with many UEs at a given time, a base station, such as BS 221-3, may communicate with some UE that can use a BWP that is defined to include the entirety of the channel BW (within region 220) or a large portion of it. Other UE are restricted to a different definition of a BWP (within region 230) to prevent interference. Therefore, different UE use different BWP definitions when communicating with a same BS to avoid interference with a NTN. This arrangement is in stark contrast to a conventional arrangement in which all UE communicating with a BS may use the same BWP.

Figure 3:
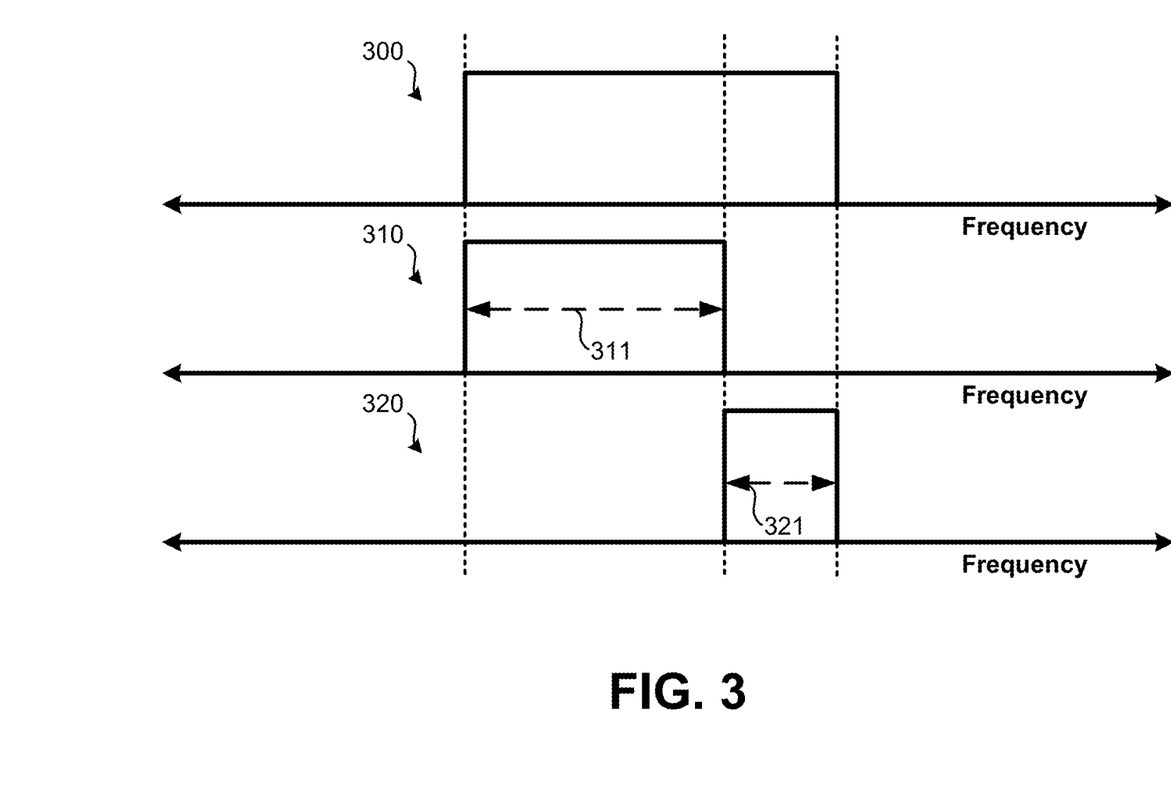
FIG. 3 illustrates a graphical representation of how spectrum may be allocated and reused in different geographical regions.

FIG. 3 illustrates a graphical representation of how spectrum may be allocated and shared among a TN and NTN while limiting an amount of interference. Bandwidth part 300 can represent the BWP that is active for UE in a region with a high signal strength with a terrestrial network, such as region 220. In regions near base stations of a NTN, such as regions 220 of FIG. 2, bandwidth part 300 may be used for communications (uplink or downlink) between UE and base stations 221.

BWP 310 represents a BWP that has overlap with bandwidth part 300. UE that experiences a lower signal strength with a base station and, thus, can be expected to be closer to the edge of a cell of the TN, may communicate using BWP 310 with the TN. BWP 310 and BWP 300 may use the same subcarrier spacing. Further, the base station may manage scheduling such that interference between UEs using BWP 300 and BWP 310 does not occur. UE may be located with region 230 of FIG. 2 when assigned BWP 310. To be clear, there is no interference issue with UE that are closer to the base station and using bandwidth part 300 since individual communications between UE and the base stations are scheduled. By a UE being closer to the edge of the cell, the UE's communications are scheduled to occur within BWP 310.

BWP 320 represents a BWP that can be used for uplink (and/or downlink) communications between UE and satellites of an NTN. BWP 320 may be fixed—that is, the NTN may not be able to adjust the frequencies used for such uplink and/or downlink communications. In other embodiments, the specific frequencies and bandwidth of BWP 320 may be adjustable. BWP 320 may be adjacent to, but may not overlap BWP 310. The sum of BWP 310 and BWP 320 may equal bandwidth part 300 or may be a subset of the frequencies of BWP 300. Therefore, UE communicating with a TN using BWP 310 does not interfere with UE communication with an NTN using BWP 320. While UE communicating with a TN using all of BWP 300 has the potential to interfere with UE communicating with a NTN using BWP 320, UE using BWP 300 (for high signal-strength communications with a BS) are far enough from the regions where UE would be using the same frequencies to communicate with a NTN.

In FIG. 3, BWP 310 has bandwidth 311 which is larger than bandwidth 321 of BWP 320. In some embodiments, bandwidth 321 is fixed and cannot be adjusted. In other embodiments, however, bandwidth 321 can be adjusted by the uplink and downlink system of the NTN (in cooperation with the TN) such that bandwidth 321 can be widened to incorporate a greater frequency range and bandwidth 311 can be narrowed to a smaller frequency range. Thus, BWP 310 and BWP 320 continue to not overlap after adjustment. Such an adjustment may be made based on TN and NTN traffic. For instance, if a large number of UE are attempting to use BWP 320 to communicate with the NTN and relatively few UE are using BWP 310 to communicate with the TN, bandwidth 321 may be widened and bandwidth 311 may be narrowed in response to the network traffics loads. Similarly, if a large number of UE are attempting to use BWP 310 to communicate with the TN and relatively few UE are using BWP 320 to communicate with the NTN, bandwidth 311 may be widened and bandwidth 321 may be narrowed in response to the network traffics loads.

Figure 4:
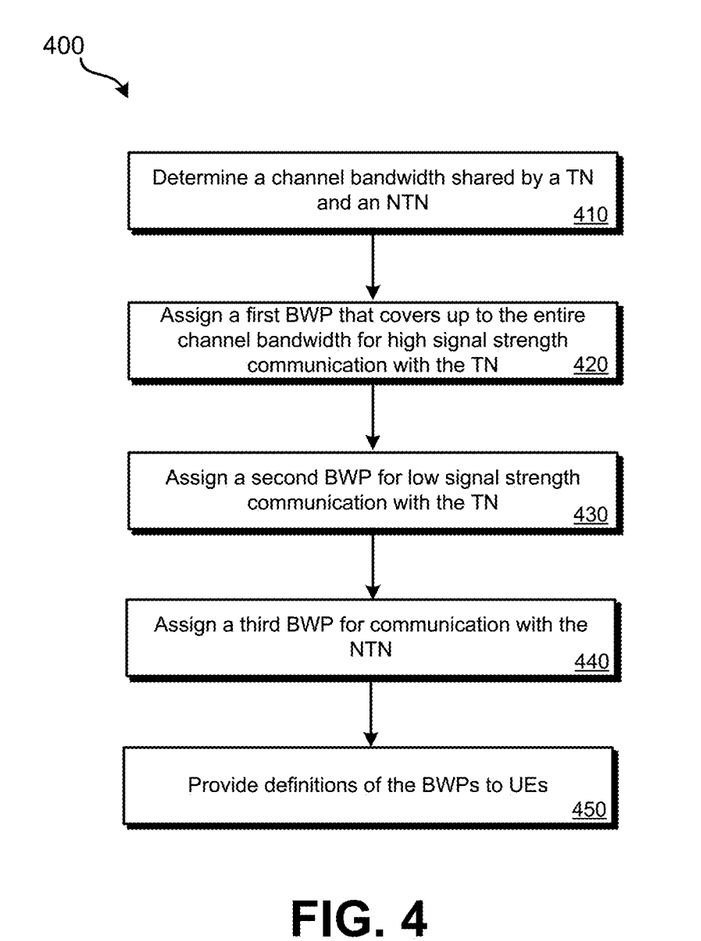
FIG. 4 illustrates an embodiment of a method for sharing spectrum among a terrestrial network and non-terrestrial network.

Various methods may be performed using the systems and arrangements of FIGS. 1-3. FIG. 4 illustrates an embodiment of a method 400 for sharing (or reusing) spectrum among a terrestrial network and a non-terrestrial network. Method 400 may be performed using system 100 of FIG. 1. Method 400 may also be performed using an alternative system arrangement that differs from system 100. More specifically, blocks of method 400 may be performed by a TN/NTN coordination system. TN/NTN coordination system may be situated as indicated in FIG. 1—that is, in communication with NTN 120 and TN 130. In other embodiments, a TN/NTN coordination system may be incorporated as part of TN 130, such as part of cellular network core components 135. In at least some of such embodiments, TN/NTN coordination system only has the ability to adjust the configuration of TN 130 (e.g., the configuration of NTN 120 may be fixed).

At block 410, a channel bandwidth that is to be shared among a TN and a NTN may be determined. The channel bandwidth may be based on frequencies that have been allocated to the NTN and TN. In some embodiments, the portion of the bandwidth allocated to the NTN may be fixed. As such, based on a received definition of the channel bandwidth and the portion of the channel bandwidth that is assigned to the NTN, a BWP can be identified that is eligible to be assigned to UE in regions in which the signal strength of the NTN and TN are not greatly different, while another BWP can be defined that includes the entire channel bandwidth (or a significant portion thereof) that can be used in regions where uplink and/or downlink signals of the TN have a much greater signal strength than uplink and/or downlink signals of the NTN.

At block 420, a first BWP can be defined for which the entire channel bandwidth (or a significant portion thereof). For example, the first BWP could refer to BWP 300 of FIG. 3. This BWP definition may be activated at UE that receive a high signal strength downlink signal from one or more base stations of the TN. In some embodiments, block 420 includes transmitting a BWP definition to the UE for storage. The BWP definition may not be enabled (and, thus, allowing for communication on the frequencies indicated by the bandwidth part) until a message indicating enablement is received from the base station. In some embodiments, all BWP definitions are provided to all UE, but only a single BWP definition is activated for uplink communications and only a single BWP definition is activated for downlink communications.

At block 430, a second BWP may be assigned to UE that receive a low signal strength downlink signal from one or more base stations of the TN. For example, BWP 310 may be used as the second BWP. The second BWP overlaps the first BWP and can use a same sub-carrier spacing. In some embodiments, block 430 includes transmitting the second BWP definition to the UE for storage. The second BWP definition may not be enabled (and, thus, allowing for communication on the frequencies indicated by the second BWP) unless an enablement message indicating as such is received by the UE from the base station. In other embodiments, no such BWP definition is transmitted to the UE unless the second BWP is to be immediately available for use by the UE. That is, the base station (or a component of the cellular core network) may only transmit the second BWP definition to the UE when the UE is authorized to communicate with the BS on such frequencies.

At block 440, a third BWP may be assigned to UE to communicate with the NTN. In some embodiments, block 440 does not need to be actively performed because UE and the NTN are pre-configured (e.g., at manufacture or initial set-up) to communicate using the third BWP (to the exclusion of the rest of the channel bandwidth). In other embodiments, the UE are provided an indication of the third BWP through the NTN, TN, or both. The third BWP fully overlaps the first BWP but does not overlap the second BWP, as indicated in FIG. 3. Since the third BWP is used for communication away from the TN, overlapping use of the third BWP and the first BWP does not cause any (or significant) interference. For block 440, the UE at which the third BWP is defined (either actively or pre-configured) may be some (or all) of the same UE of blocks 420 and 430 (e.g., UE that can communicate with both the NTN and TN, such as UE 110-2), or may be separate UE (e.g., UE that only communicate with the NTN, such as UE 110-1). Some UEs, such as UE that can only communicate with the TN (e.g., UE 110-3), may not be involved in block 440.

At block 450, in some embodiments, all three (or more) BWP definitions are provided to UEs. Block 450 may include transmitting definitions via a base station, such as a gNodeB of a 5G NR cellular network. Therefore, for example, UE communicating with the TN may receive definitions of both the first BWP, the second BWP, and, possibly, the third BWP. An instruction on which BWP to be activated may also be received from the base station.

Figure 5:
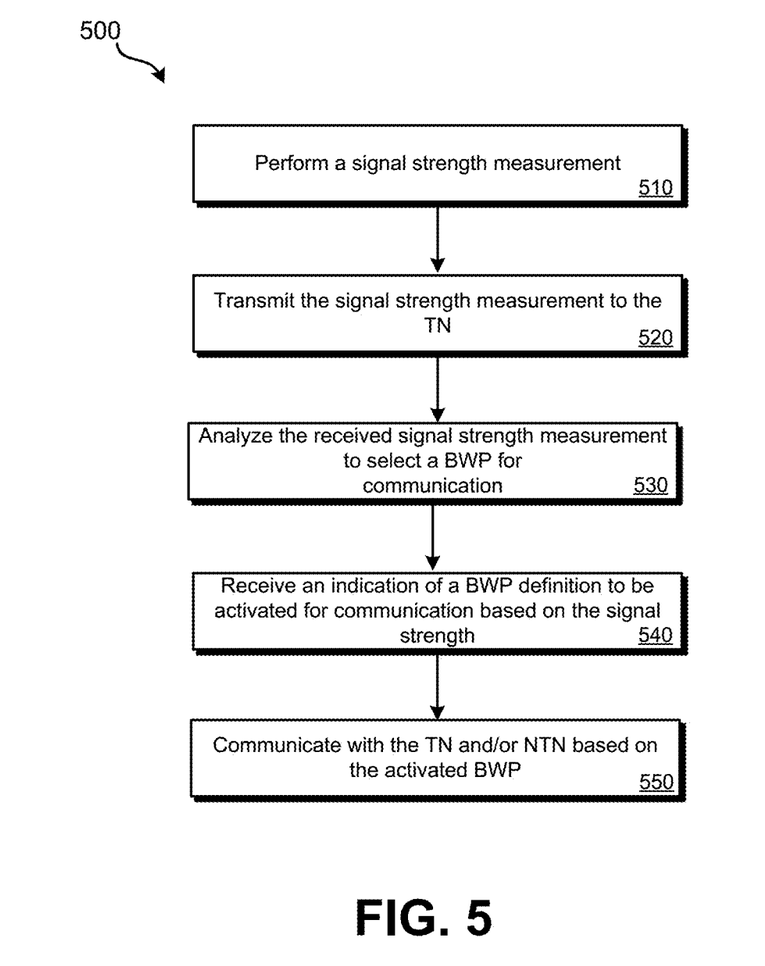
FIG. 5 illustrates an embodiment of a method for sharing spectrum among a terrestrial network and non-terrestrial network based on signal strength.

FIG. 5 illustrates an embodiment of a method 500 for sharing (or reusing) spectrum among a terrestrial network and non-terrestrial network based on signal strength. Method 500 may be performed using system 100 of FIG. 1. Method 500 may also be performed using an alternative system arrangement that differs from system 100. More specifically, blocks of method 500 may be performed using UE and a TN/NTN coordination system. TN/NTN coordination system may be situated as indicated in FIG. 1—that is, in communication with NTN 120 and TN 130. In other embodiments, a TN/NTN coordination system may be incorporated as part of TN 130, such as part of cellular network core components 135. In at least some of such embodiments, TN/NTN coordination system only has the ability to adjust the configuration of TN 130 (e.g., the configuration of NTN 120 may be fixed).

At block 510, one or more signal strength measurements may be performed. The signal strength measurements may be performed by the UE. The UE, therefore, may be measuring a signal strength of a downlink signal from one or more base stations of a TN. In other embodiments, a TN may measure the signal strength of an uplink signal from the UE transmitted to a BS of the TN. In some embodiments, the results of multiple signal strength measurements may be averaged or otherwise combined. At block 520, assuming the UE performed the one or more signal strength measurements, an indication of the signal strength measurement or combination of the signal strength measurements may be transmitted to the TN.

At block 530, a component of the TN (e.g., a base station, a component of the core network) or a separate TN/NTN coordination system may analyze the received signal strength measurement to determine which BWP the UE should be using for communication with the TN. In some embodiments, this analysis may be performed directly by the UE. Block 530 may include the signal strength being compared to a stored signal strength threshold value. If the signal strength is greater than the stored signal strength threshold value, the UE may be considered to have a high signal-strength (and communication with the TN may be permitted using the first BWP of method 400). If the signal strength is less than the stored signal strength threshold value, the UE can be considered to have a low signal-strength (and communication with the TN may be permitted using the second BWP of method 400.

At block 540, in some embodiments, the TN may transmit (e.g., via a BS) one or more messages that includes an indication to the UE of which BWP should be active for uplink or downlink communications with the BS. As part of block 540, the transmitted one or more messages may be received and used to configured the UE. It should be noted that since the TN communicates with multiple UE at a given time, while some UE may experience a high signal strength, others may experience a low signal strength. Therefore, at any given time, a particular base station may be communicating with UEs that have different active BWPs. If the signal strength is assessed by the UE directly, rather than at the TN, the UE may restrict its uplink communication to be the second BWP rather than the first BWP of method 400.

At block 550, communications (uplink or downlink) between the UE and the TN may be performed within the assigned BWP. As the measured signal strength changes (e.g., due to movement of the UE to another location), which BWP is used by the UE can be dynamically adjusted by the UE or by the TN. For UE communicating with the NTN, such UE may use the third BWP of method 400 that does not overlap with the second BWP, such as shown in relation to BWP 320. The TN/NTN coordination system may monitor network loads across the NTN and TN and reallocate bandwidth for the first portion and second portion as needed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for spectrum sharing among a terrestrial cellular network and a non-terrestrial network, the method comprising:
    assigning, by a network coordination system, a first bandwidth part having a first frequency range, for use for communication between one or more of a plurality of user equipment (UE) and a terrestrial cellular network when a high signal strength is present;
    assigning, by the network coordination system, a second bandwidth part, having a second frequency range, for use for communication between one or more of the plurality of UE and the terrestrial cellular network when a low signal strength is present, wherein:
        the second frequency range of the second bandwidth part overlaps with the first frequency range of the first bandwidth part and uses a same subcarrier spacing;
        a third bandwidth part having a third frequency range is assigned for use for communication between one or more of the plurality of UE and the non-terrestrial network; and
        the third bandwidth part overlaps with the first bandwidth part but not the second bandwidth part; and
    scheduling communications between the terrestrial cellular network and one or more of the plurality of UE using the first bandwidth part and the second bandwidth part based on signal strength.

2. The method for spectrum sharing among the terrestrial cellular network and the non-terrestrial network of claim 1, further comprising:
    causing definitions of the first bandwidth part and the second bandwidth part to be provided to the plurality of UE.

3. The method for spectrum sharing among the terrestrial cellular network and the non-terrestrial network of claim 1, further comprising:
    performing, by a UE of the plurality of UE, a signal strength measurement indicative of a signal strength of a signal received from the terrestrial cellular network.

4. The method for spectrum sharing among the terrestrial cellular network and the non-terrestrial network of claim 3, further comprising:
    transmitting, by the UE, an indication of the signal strength measurement to the terrestrial cellular network.

5. The method for spectrum sharing among the terrestrial cellular network and the non-terrestrial network of claim 4, further comprising:
    analyzing the indication of the signal strength measurement to select the second bandwidth part.

6. The method for spectrum sharing among the terrestrial cellular network and the non-terrestrial network of claim 5, wherein analyzing the indication of the signal strength measurement comprises comparing the indication of the signal strength measurement to a threshold signal strength value.

7. The method for spectrum sharing among the terrestrial cellular network and the non-terrestrial network of claim 6, further comprising:
in response to the comparison of the indication of the signal strength measurement to the threshold signal strength value, using, by the UE, the second bandwidth part for communication with the terrestrial cellular network.

8. The method for spectrum sharing among the terrestrial cellular network and the non-terrestrial network of claim 7, further comprising:
communicating, by the UE, with the non-terrestrial network using the third bandwidth part.

9. The method for spectrum sharing among the terrestrial cellular network and the non-terrestrial network of claim 1, further comprising:
communicating, by a UE, with the non-terrestrial network using the third bandwidth part.

10. The method for spectrum sharing among the terrestrial cellular network and the non-terrestrial network of claim 9, wherein the terrestrial cellular network comprises one or more base stations and the non-terrestrial network comprises one or more satellites.

11. The method for spectrum sharing among the terrestrial cellular network and the non-terrestrial network of claim 7, wherein the plurality of UE are configured to communicate using 5G New Radio (NR) radio access technology (RAT) with the terrestrial cellular network.

12. A system comprising:
a network coordination system, comprising one or more processors, in communication with a terrestrial cellular network, configured to:
assign a first bandwidth part having a first frequency range for use for communication between one or more UE of a plurality of UE and the terrestrial cellular network when a high signal strength is present;
assign a second bandwidth part having a second frequency range for use for communication between one or more UE of the plurality of UE and the terrestrial cellular network when a low signal strength is present, wherein:
the second frequency range of the second bandwidth part overlaps with the first frequency range the first bandwidth part and uses a same subcarrier spacing;
a third bandwidth part having a third frequency range is assigned for use for communication between one or more UE of the plurality of UE and a non-terrestrial network; and
the third bandwidth part overlaps with the first bandwidth part but not the second bandwidth part; and
schedule communications between the terrestrial cellular network and one or more UE of the plurality of UE using the first bandwidth part and the second bandwidth part based on signal strength.

13. The system of claim 12, further comprising the terrestrial cellular network, configured to:
communicate with one or more UE of the plurality of UE using the first bandwidth part when the high signal strength is determined to be present; and
communicate with one or more UE of the plurality of UE using the second bandwidth part when the low signal strength is determined to be present.

14. The system of claim 13, wherein the terrestrial cellular network is further configured to transmit definitions of the first bandwidth part and the second bandwidth part to the plurality of UE.

15. The system of claim 14, further comprising the plurality of UE.

16. The system of claim 15, wherein each UE of the plurality of UE is configured to perform a signal strength measurement indicative of a signal strength of a signal received from the terrestrial cellular network.

17. The system of claim 16, wherein:
each UE of the plurality of UE is configured to transmit an indication of the signal strength measurement to the terrestrial cellular network; and
the terrestrial cellular network is further configured to analyze each indication received from the plurality of UE to select either the first bandwidth part or the second bandwidth part for the corresponding UE of the plurality of UE.

18. The system of claim 16 wherein the plurality of UE or the terrestrial cellular network is configured to compare the signal strength measurement indicative of the signal strength to a threshold signal strength value.

19. The system of claim 15, wherein the plurality of UE use 5G New Radio (NR) radio access technology (RAT) to communication with the terrestrial cellular network.

20. A non-transitory processor-readable medium comprising processor-readable instructions configured to cause one or more processors to:
assign a first bandwidth part having a first frequency range for use for communication between one or more UE of a plurality of UE and a terrestrial cellular network when a high signal strength is present;
assign a second bandwidth part having a second frequency range for use for communication between one or more UE of the plurality of UE and the terrestrial cellular network when a low signal strength is present, wherein:
the second frequency range of the second bandwidth part overlaps with the first frequency range the first bandwidth part and uses a same subcarrier spacing;
a third bandwidth part having a third frequency range is assigned for use for communication between one or more UE of the plurality of UE and a non-terrestrial network; and
the third bandwidth part overlaps with the first bandwidth part but not the second bandwidth part; and
schedule communications between the terrestrial cellular network and one or more UE of the plurality of UE using the first bandwidth part and the second bandwidth part based on signal strength.

* * * * *